United States Patent [19]
Perret

[11] 3,806,608

[45] Apr. 23, 1974

[54] SYNTHETIC EGG COMPOSITION

[75] Inventor: Marcel Andre Perret, Greenwich, Conn.

[73] Assignee: Rhodia, Inc., New York, N.Y.

[22] Filed: Mar. 6, 1972

[21] Appl. No.: 232,277

[52] U.S. Cl. .............................. 426/175, 426/211
[51] Int. Cl. ............................................. A23j 3/02
[58] Field of Search............ 99/113, 114, 140 R, 14, 99/17

[56] References Cited
UNITED STATES PATENTS
3,640,732  2/1972  Johnson ............................. 99/114

Primary Examiner—A. Louis Monacell
Assistant Examiner—R. A. Yoncoskie

[57] ABSTRACT

A synthetic egg composition is provided having an excellent egg or yolk flavor despite the absence of natural yolk, and comprising as the essential ingredients either a water-soluble albumin or a fatty oil, or both, at least one amino acid, and an inorganic sulfide. In the presence of water, the composition has an alkaline pH within the range from about 7 to about 9.5, and can be formulated as a liquid, paste, or powder. The flavor and texture can be made to approximate an egg so closely as to be indistinguishable from the natural product to a flavor test panel.

18 Claims, No Drawings

SYNTHETIC EGG COMPOSITION

Over the past 100 years, many efforts have been made to develop an egg substitute having a good egg flavor. However, no one has been able to formulate a truly acceptable product without part of the natural yolk, which imparts all of the egg taste and flavor.

During the latter part of the nineteenth century, the efforts appear to have been stimulated by difficulties in acquiring, transporting, and preserving eggs, as a result of which they were relatively costly and not necessarily of acceptable quality, usually because they were not fresh. Thus, Griffin U.S. Pat. No. 1,706,670 dated Oct. 7, 1875 proposed an egg substitute based on cream of tartar, tartaric acid, alum, sodium bicarbonate, sugar, curcuma, gum-arabic, sulfur and starch, which, he asserted, was a perfect substitute for eggs in all culinary and other uses, being cheaper, and producing better results than the eggs themselves. However, this seems not to have been the case. The egg flavor was not acceptable, and it is noteworthy that later workers recognized the importance of the egg yolk in developing the taste of an egg-like product.

For example, Netherlands patent application No. 68/17004 (1970) proposed a low calorie dried egg product with a low fat content, but a proportion of whole eggs was incorporated in order to impart the egg flavor.

Melnick U.S. Pat. No. 3,563,765 dated Feb. 16, 1971 provided a partially defatted dry egg yolk product prepared by extracting at least 50% but not more than 90% of the original fat from egg yolk solids, together with at least 50% of the cholesterol content of the egg yolk, seeking to overcome difficulties presented by the natural egg product to some people by removing the ingredients objected to in the natural product, namely, the fats and cholesterol.

Melnick points out that many people showing a tendency toward high serum cholesterol levels are required to limit or exclude eggs from their diet, because the dietary cholesterol from egg yolk is more effective in raising serum cholesterol levels than an equivalent amount of cholesterol incorporated as such in the diet. Although egg-like products free of cholesterol have been provided, using synthetic yolk mterials fabricated from vegetable sources, as in U.S. Pat. No. 3,207,609, the synthetic products available are so different from normal eggs in odor, texture, and taste as to be unacceptable to most users. Melnick accordingly seeks to overcome these difficulties by removing the harmful ingredients from the natural egg material per se, seeking in this way to retain as much as possible of the usual flavor of the egg product.

It is well known that liquid whole chicken eggs are composed of about 64% egg white, and about 36% egg yolk. The composition of each of these components is quite complex, and even now is not fully understood. Egg white contains approximately 12% matter which is proteinaceous and is referred to as albumen (as opposed to albumin, which is the class of pure protein of this type, but is derived from many other sources, as well as eggs). The egg white or albumen is in the form of an aqueous solution of the phospho-proteinaceous material, containing small amounts of minerals and sugars, and only a trace of fat. The egg yolk contains virtually all of the fat and cholesterol of the egg, and imparts the characteristic egg-like taste and flavor properties.

The yolk is composed of about 50% solid matter, with both bound and unbound lipids, as well as cholesterol and proteins of a complex nature, probably in some obscure relationship with the lipid material as lipoprotein complexes. A part of the lipids, the free lipids, is easily extractable with fat solvents, but the remainder, the bound lipids, is not.

The taste of the egg yolk is the part of the egg that is the most difficult to duplicate in an egg substitute, probably because of the complexity of the materials present in the yolk. It is the failure to duplicate the egg-like taste and flavor properties of the egg yolk that has led to the failure in the marketplace of most egg substitutes, and this in turn has forced those seeking to develop egg substitutes to rely at least in part upon the flavor imparted to the egg substitute material by the addition of naturally-occurring egg yolk-derived components.

In accordance with the instant invention, a synthetic egg composition is provided having the flavor of whole chicken eggs or egg yolk even though it is totally free from any naturally-occurring egg yolk-derived components. It is believed that this is the first time that the flavor of natural eggs and especially natural egg yolk has been approximated to the extent of making the synthetic product and the natural product indistinguishable.

The synthetic egg composition of the invention comprises as the essential ingredients either a water-soluble albumin or an edible fatty oil, or both, at least one amino acid, and an inorganic sulfide, and has an alkaline pH within the range from about 7 to about 9.5 in the presence of water. The composition can be formulated as an aqueous solution or dispersion, a paste, or a dried powder, and can be made to approximate an egg, including egg yolk and total egg (white + yolk), in flavor and texture.

It is believed that the combination of amino acid, inorganic sulfide and alkaline pH of the composition of the invention is primarily responsible for the egg-like flavor of the product. The water-soluble albumin and fatty oil contribute body and texture to the composition, and usually both are used to approximate a whole egg. For an egg yolk, only one need be used, but both can be used, if desired.

One amino acid can be used, but for better flavor it is preferred to employ a mixture of amino acids. Any amino acid is useful. Thus, the amino acid can be selected from the group consisting of DL-isoleucine, DL-leucine, DL-valine, DL-methionine, threonine, DL-tryptophane, L-cysteine, DL-phenylalanine, L-tryosine, L-lysine, L-histidine, L-arginine, β-alanine, glutamic acid, cystine, glycine, aspargine, aspartic acid, serine, gentamine, proline, hydroxyproline, thyroxine, thiozine, and hydroxylysine. Two or more of these amino acids can be used, in any combinations. A preferred amino acid mix is indicated below, but any other combination can be used:

|  | Parts by Weight | |
| Amino Acid | Preferred | Range |
| --- | --- | --- |
| DL-isoleucine | 2 | 0.5 to 5 |
| DL-leucine | 3 | 0.5 to 5 |
| DL-valine | 2 | 0.5 to 5 |

Table-Continued

| Amino Acid | Parts by Weight | |
|---|---|---|
| | Preferred | Range |
| DL-methionine | 1 | 0.2 to 3 |
| L-cysteine hydrochloride | 0.5 | 0.1 to 3 |
| DL-phenylalanine | 1.5 | 0.2 to 3 |
| L-tyrosine | 1.5 | 0.2 to 3 |
| Threonine | 1.5 to 0 | 0 to 3 |
| DL-tryptophane | 0.5 to 0 | 0 to 3 |
| L-lysine monohydrochloride | 2.0 | 0.5 to 5 |
| L-histidine | 0.5 | 0.1 to 3 |
| L-arginine hydrochloride | 2.0 | 0.5 to 5 |

The amino acid can also be in the form of a suitable protein hydrolysate. Exemplary are hydrolyzed vegetable proteins derived from peanuts or soya beans, hydrolyzed animal proteins such as hydrolyzed deflavored cod flesh, keratin protein, as well as the hydrolyzed plant proteins occurring in cereal grain, such as wheat and known as gluten. The protein hydrolysates generally comprise the constituent amino acids in peptide nonultimate amino acid form, representative of the source protein in the complex mixture in which they occur naturally, and in this respect differ significantly from individual mixtures of amino acids prepared synthetically, which are also effective in the compositions of the invention.

The amino acid can be used in very small amount. As little as 0.001% by weight of the solids of the composition is sufficient, but the amount can be considerably higher, ranging up to about 5%.

Preferably, the amount of amino acid is within the range from about 0.01% to about 3% by weight of the solids of the composition.

An inorganic sulfide is added also, in a very small amount. Free hydrogen sulfide can be used as the inorganic sulfide. Any alkali metal or alkaline earth metal sulfide or sulfhydride, for example ammonium sulfide, sodium sulfide or hydrosulfide, potassium hydrosulfide, and calcium hydrosulfide, which may generate hydrogen sulfide, can also be used as the inorganic sulfide. A trace is adequate, for instance, one drop of a 20% aqueous solution of ammonium sulfide in 350 g. of composition. Thus, the amount of inorganic sulfide can be within the range from about 0.00001% to about 0.1%, based on the solids content. It is preferred to incorporate the inorganic sulfide into the mix by diffusion in a smooth but indirect manner, such as by impregnating the inorganic sulfide into a porous surface, which is then brought into contact with the composition.

If neither the amino acid nor inorganic sulfide is present, the composition is wholly devoid of the flavor of eggs. Both must be present, for good egg flavor.

Body and texture, when desired, can be provided to the synthetic egg product of the invention by a water-soluble albumin or a fatty oil, or both.

The albumins are a group of simple proteins that yield mostly amino acids upon cleavage by enzymes or acids, and are found in nearly all living body tissues. Examples of albumins are grain albumin, soybean albumin, ovalbumin (albumin from egg white), serum albumin (albumin from blood), and lactalbumin (albumin from milk). The albumins are soluble in water.

The amount of albumin is within the range from about 0% to about 90%, preferably from 15% to about 85%, by weight of solids.

Alternatively, an edible fatty oil can be included to improve body and texture, as well as impart a fatty flavor, in order to approximate the flavor and texture of a whole egg. The fatty acid mono, di, and tri glycerides derived from natural oils and fats, usually employed in admixture, are preferred. Exemplary are the fatty acid glycerides derived from corn oil, sheep tallow, beef tallow, mutton tallow, hog fat, lard, chicken fat, soybean oil, peanut oil, safflower seed oil, sesame seed oil, sunflower seed oil, tung oil, palm kernel oil, coconut oil, cottonseed oil, fish oil such as codliver oil, shark oil, and whale oil, olive oil, and vegetable oils. An example of spray-dried vegetable oil base is Vee-Kreme, the constitution of which is partially hydrogenated vegetable oil, lactose, sodium caseinate, dipotassium phosphate, and butylated hydroxyanisole.

If the egg product is used in a preparation where eggs are one of several other ingredients, the egg body and texture are less important, and either the fatty oil or the albumin can be omitted.

The amount of fatty oil is within the range from about 0% to about 90%, and preferably from 0% to about 75% by weight of the solids.

The pH is brought to above 7, up to approximately 9.5, and preferably within the range from about 7.1 to about 7.5 by addition of an alkaline compound. Exemplary are alkali metal or alkali earth metal and alkali metal and alkaline earth metal carbonates and bicarbonates, such as sodium carbonate, sodium bicarbonate, potassium carbonate, potassium bicarbonate, calcium carbonate and calcium bicarbonate.

The amount of the alkaline compound is within the range from about 0.05% to about 10%, and preferably from about 0.1% to about 3%, to bring the pH to within the desired range.

In addition to the above-indicated essential ingredients, substances such as mineral salts can also be added, such as sodium chloride, especially phosphates as, for instance, potassium phosphate, sodium phosphate, ammonium phosphate, calcium phosphate; lecithin; sugars such as sucrose, dextrose, glucose, fructose, galactose, xylose, mannose, ribose, arabinose, maltose, and lactose; milk products such as dried milk, dried whey and casein; surfactants such as the mono and di fatty glycerides or polyols; sodium inosinate; sodium guanylate; sodium and calcium alginate compositions; and coloring agents. If present, these are added in small amounts, within the range from about 0.00001% to about 25%, preferably from 0.1% to about 15%, by weight of the solids.

Thus, the synthetic egg compositions of the invention have the following formulation:

| Ingredient | Amount - % | |
|---|---|---|
| | Overall Range | Preferred Range |
| Amino acid | 0.001 to 5 | 0.1 to 3 |
| Inorganic sulfide | 0.00001 to 0.1 | 0.0001 to 0.01 |
| Albumin | 0 to 90 | 15 to 85 |
| Fatty oil | 0 to 90 | 0    75 |
| Lecithin | 0 to 25 | 2 to 15 |
| Milk products | 0 to 20 | 0 to 10 |
| Sugar | 0 to 10 | 0 to 5 |

| | Amount – % | |
|---|---|---|
| Ingredient | Overall Range | Preferred Range |
| Miscellaneous (Emulsifiers, palate sensitizers, coloring agents, mineral salts) | 0 to 10 | 1 to 5 |
| pH | 7 to 9.5 | 7.1 to 7.5 |

For a whole egg, taken as an egg, such as a scrambled egg dish, approximately equal amounts of albumin and fatty oil best approximate the texture and mouth feel of a fresh egg. For other uses, where texture and mouth feel are not important, the proportion of albumin and fatty oil can vary widely within the stated ranges.

The synthetic egg product can be in the form of a liquid, paste, or powder, depending mainly on the type of oil or fat employed, a liquid oil leading to a liquid or semi-solid material, and a solid fat leading to a powder. If the product is to be used as a liquid, an amount of water is added to obtain a consistency approximating a fresh liquid egg. In cooking and other applications the liquid, pasty, or dried egg-like concentrate can be used as is, i.e., as obtained after formulation.

The compositions of the invention are prepared by simple mixing or blending of the ingredients. The solids can be mixed first, and then mixed into the liquids. If water is present, the water-soluble ingredients can be dissolved in the water, and then the other ingredients blended in. A homogeneous solution or dispersion is desired in the case of liquids. A uniform solid mix can be obtained by first dispersing or dissolving the ingredients in a volatile liquid, such as water or alcohol, and then volatilizing the liquid, to recover the composition as a solid residue, paste, or powder.

The compositions can be used cold, after mixing, or cooked at elevated temperature, using the normal cooking techniques for eggs, especially frying and baking.

The following Examples in the opinion of the inventors represent preferred embodiments of the invention. In each case, the formulations given were prepared by blending the listed ingredients in the amounts stated, using a colloid mill, until a stable uniform composition was obtained, in the form of a liquid or paste, when sufficient liquids were present, or in the form of dried powder, when any liquids present were wholly absorbed on the solid materials.

EXAMPLE 1

An amino acid blend (18 g.) was prepared, having the following composition:

| Grams | Amino Acid |
|---|---|
| 2.0 | DL-isoleucine |
| 3.0 | DL-leucine |
| 2.0 | DL-valine |
| 1.0 | DL-methionine |
| 0.5 | L-cysteine hydrochloride |
| 1.5 | DL-phenylalanine |
| 1.5 | L-tyrosine |
| 1.5 | Threonine |
| 0.5 | DL-tryptophane |
| 2.0 | L-lysine monohydrochloride |
| 0.5 | L-histidine |
| 2.0 | L-arginine hydrochloride |

A synthetic egg composition was prepared to the formulation:

| Grams | Ingredient |
|---|---|
| 325.0 | Water |
| 50.0 | Powdered egg albumen |
| 0.25 | Amino acid blend |
| 2.5 | Dextrose |
| 1.5 | Sodium chloride |
| 45.0 | Crisco shortening (a partially hydrogenated vegetable oil) |
| 5.0 | Lecithin |
| 2.0 | Sodium bicarbonate – to adjust pH between 7.2 and 7.5 |
| 1 drop | Ammonium sulfide (20% aqueous solution) |
| Trace | Yellow food color |
| Trace | β-carotene to give egg color |

This synthetic egg composition was blended with 1% ham flavor and cooked in a frying pan in the manner of a scrambled egg. The resulting composition was excellent in flavor and had a texture very similar to real scrambled eggs and ham. Similar flavor sensations were obtained with addition of 2% Gruyere cheese and 1% spice blend.

EXAMPLE 2

An amino acid blend (18 g.) was prepared, having the following composition:

| Grams | Amino Acid |
|---|---|
| 2.0 | DL-isoleucine |
| 3.0 | DL-leucine |
| 2.0 | DL-valine |
| 1.0 | DL-methionine |
| 0.5 | L-cysteine hydrochloride |
| 1.5 | DL-phenylalanine |
| 1.5 | L-tyrosine |
| 1.5 | Threonine |
| 0.5 | DL-tryptophane |
| 2.0 | L-lysine monohydrochloride |
| 0.5 | L-histidine |
| 2.0 | L-arginine hydrochloride |

An egg composition was prepared to the formulation:

| Grams | Ingredient |
|---|---|
| 50.0 | Egg albumen (dried powder) |
| 1.5 | Amino acid blend |
| 3.0 | Dextrose |
| 2.0 | Sodium chloride |
| 10.0 | Lecithin (dry) |
| 2 drops | Ammonium sulfide (20% aqueous solution) |
| 2.0 | Sodium bicarbonate |

The cold composition had a flavor corresponding to egg yolks, after being mixed with water, dry mustard, salt, black pepper, mayonnaise, vinegar, Worcestershire sauce, and chopped onion, in the manner of preparing plain deviled egg, and without the need for any cooking.

EXAMPLE 3

An amino acid blend (18 g.) was prepared, having the following composition:

| Grams | Amino Acid |
|---|---|
| 2.0 | DL-isoleucine |
| 3.0 | DL-leucine |
| 2.0 | DL-valine |
| 1.0 | DL-methionine |
| 0.5 | L-cysteine hydrochloride |
| 1.5 | DL-phenylalanine |
| 1.5 | L-tyrosine |
| 1.5 | Threonine |
| 0.5 | DL-tryptophane |
| 2.0 | L-lysine monohydrochloride |
| 0.5 | L-histidine |
| 2.0 | L-arginine hydrochloride |

A synthetic egg composition was prepared to the formulation:

| Grams | Ingredient |
|---|---|
| 250.0 | Powdered egg albumen |
| 1.3 | Amino acid blend |
| 13.0 | Dextrose |
| 8.0 | Sodium chloride |
| 250.0 | Shortening (Crisco) |
| 25.0 | Lecithin |
| 0.3 | β-Carotene |
| 20 drops | Yellow food color |
| 5 drops | Ammonium sulfide (20% aqueous solution) |
| 28.0 | Dry milk |
| 5.0 | Sodium bicarbonate |

The composition, after mixing with water and cooking in a frying pan with butter, behaved and tasted like a real scrambled fresh egg.

EXAMPLE 4

An amino acid blend (18 g.) was prepared, having the following composition:

| Grams | Amino Acid |
|---|---|
| 2.0 | DL-isoleucine |
| 3.0 | DL-leucine |
| 2.0 | DL-valine |
| 1.0 | DL-methionine |
| 0.5 | L-cysteine hydrochloride |
| 1.5 | DL-phenylalanine |
| 1.5 | L-tyrosine |
| 1.5 | Threonine |
| 0.5 | DL-tryptophane |
| 2.0 | L-lysine monohydrochloride |
| 0.5 | L-histidine |
| 2.0 | L-arginine hydrochloride |

A synthetic egg composition was prepared to the following formulation:

| Grams | Ingredient |
|---|---|
| 125.0 | Egg albumen (dried powder) |
| 125.0 | Chicken fat |
| 10.0 | Lecithin (liquid) |
| 6.5 | Dextrose |
| 3.0 | Sodium chloride |
| 5.0 | Sodium bicarbonate |
| 0.3 | Amino acid blend (as above) |
| 1/6 cup | Instant dry milk ground fine |
| 0.025 | β-Carotene (10% in vegetable oil) |
| 10.0 | Kelset[1] |
| 0.5 | Tween 60[2] |
| 0.05 | Atmos 300[3] |
| 1 drop | Ammonium sulfide (20% aqueous solution) |

[1] Sodium and calcium alginates
[2] Polyoxyethylene polysorbitan esters
[3] Liquid mono- and di-fatty acid glycerides After adding 1.5 g. ham flavor to a mix of one teaspoon of this mixture plus two ounces of water, the taste was of delicious ham and eggs. Without the ham, the flavor was of scrambled eggs. The flavor is enhanced further by addition of monosodium glutamate.

EXAMPLE 5

An amino acid blend (18 g.) was prepared, having the following composition:

| Grams | Amino Acid |
|---|---|
| 2.0 | DL-isoleucine |
| 3.0 | DL-leucine |
| 2.0 | DL-valine |
| 1.0 | DL-methionine |
| 0.5 | L-cysteine hydrochloride |
| 1.5 | DL-phenylalanine |
| 1.5 | L-tyrosine |
| 1.5 | Threonine |
| 0.5 | DL-tryptophane |
| 2.0 | L-lysine monohydrochloride |
| 0.5 | L-histidine |
| 2.0 | L-arginine hydrochloride |

A synthetic egg composition was prepared to the following formulation:

| Grams | Ingredient |
|---|---|
| 125.0 | Egg albumen (dry powder) |
| 125.0 | Peanut oil |
| 10.0 | Lecithin |
| 6.5 | Dextrose |
| 3.0 | Sodium chloride |
| 5.0 | Sodium bicarbonate |
| 0.3 | Amino acid blend (as above) |
| 1/6 cup | Instant dry milk ground fine |
| 0.025 | β-Carotene (10% in vegetable oil) |
| 10.0 | Kelset |
| 0.5 | Tween 60 |
| 0.5 | Atmos 300 |
| 1 drop | Ammonium sulfide (20% aqueous solution) |

One teaspoon of this mixture plus two ounces of water was fried as an egg in butter. The cooked product was indistinguishable from a real scrambled egg.

EXAMPLE 6

An amino acid blend (18 g.) was prepared, having the following composition:

| Grams | Amino Acid |
|---|---|
| 2.0 | DL-isoleucine |
| 3.0 | DL-leucine |
| 2.0 | DL-valine |
| 1.0 | DL-methionine |
| 0.5 | L-cysteine hydrochloride |
| 1.5 | DL-phenylalanine |
| 1.5 | L-tyrosine |
| 1.5 | Threonine |
| 0.5 | DL-tryptophane |
| 2.0 | L-lysine monohydrochloride |
| 0.5 | L-histidine |
| 2.0 | L-arginine hydrochloride |

A synthetic egg composition was prepared to the following formulation:

| Grams | Ingredient |
|---|---|
| 125.0 | Egg albumen (dry powder) |
| 125.0 | Crisco shortening |
| 10.0 | Lecithin |
| 6.5 | Dextrose |
| 5.0 | Sodium bicarbonate |
| 0.3 | Amino acid blend (as above) |
| 15.0 | Instant powdered milk |
| 0.025 | β-Carotene |
| 5.0 | Kelset |
| 0.5 | Tween 60 |
| 0.05 | Atmos 300 |
| 1 drop | Ammonium sulfide (20% aqueous solution) |
| 0.3 | Monosodium glutamate |
| 0.025 | Ribotide |

The composition was excellent as a substitute for eggs in numerous applications, such as scrambled eggs, mayonnaise, and in baked products such as brioches.

EXAMPLE 7

An amino acid blend (18 g.) was prepared, having the following composition:

| Grams | Amino Acid |
|---|---|
| 2.0 | DL-isoleucine |
| 3.0 | DL-leucine |
| 2.0 | DL-valine |
| 1.0 | DL-methionine |
| 0.5 | L-cysteine hydrochloride |
| 1.5 | DL-phenylalanine |
| 1.5 | L-tyrosine |
| 1.5 | Threonine |
| 0.5 | DL-tryptophane |
| 2.0 | L-lysine monohydrochloride |
| 0.5 | L-histidine |
| 2.0 | L-arginine hydrochloride |

A synthetic egg composition was prepared to the following formulation:

| Grams | Ingredient |
|---|---|
| 125.0 | Powdered egg albumen |
| 125.0 | Crisco shortening |
| 10.0 | Lecithin |
| 6.5 | Dextrose |
| 5.0 | Sodium bicarbonate |
| 0.3 | Amino acid blend (as above) |
| 15.0 | Instant powdered milk |
| 0.025 | β-Carotene |
| 5.0 | Kelset |
| 0.5 | Tween 60 |
| 0.5 | Atmos 300 |
| 0.025 | Ammonium sulfide (20% aqueous solution) |
| 0.3 | Monosodium glutamate |
| 0.025 | Ribotide |
| 3.0 | Sodium chloride |

The composition was excellent as a substitute for eggs in numerous applications, such as scrambled eggs, mayonnaise, and in baked products such as brioches.

EXAMPLE 8

An amino acid blend (18 g.) was prepared, having the following composition:

| Grams | Amino Acid |
|---|---|
| 2.0 | DL-isoleucine |
| 3.0 | DL-leucine |
| 2.0 | DL-valine |
| 1.0 | DL-methionine |
| 0.5 | L-cysteine hydrochloride |
| 1.5 | DL-phenylalanine |
| 1.5 | L-tyrosine |
| 1.5 | Threonine |
| 0.5 | DL-tryptophane |
| 2.0 | L-lysine monohydrochloride |
| 0.5 | L-histidine |
| 2.0 | L-arginine hydrochloride |

A synthetic egg composition was prepared to the following formulation:

| Grams | Ingredient |
|---|---|
| 250.0 | Powdered egg albumen |
| 250.0 | Butter oil |
| 20.0 | Lecithin |
| 13.0 | Dextrose |
| 10.0 | Sodium bicarbonate |
| 0.6 | Amino acid blend (as above) |
| 30.0 | Instant powdered milk |
| 0.05 | β-Carotene |
| 1.0 | Kelset |
| 1.0 | Tween 60 |
| 1.0 | Atmos 300 |
| 0.05 | Ammonium sulfide |
| 0.6 | Monosodium glutamate |
| 0.05 | Ribotide |

The composition was excellent as a substitute for eggs in numerous applications, such as scrambled eggs, mayonnaise, and in baked products such as brioches.

EXAMPLE 9

An amino acid blend (18 g.) was prepared, having the following composition:

| Grams | Amino Acid |
|---|---|
| 2.0 | DL-isoleucine |
| 3.0 | DL-leucine |
| 2.0 | DL-valine |
| 1.0 | DL-methionine |
| 0.5 | L-cysteine hydrochloride |
| 1.5 | DL-phenylalanine |
| 1.5 | L-tyrosine |
| 1.5 | Threonine |
| 0.5 | DL-tryptophane |
| 2.0 | L-lysine monohydrochloride |
| 0.5 | L-histidine |
| 2.0 | L-arginine hydrochloride |

A synthetic egg composition was prepared to the following formulation:

| Grams | Ingredient |
|---|---|
| 150.0 | Egg albumen (dried powder) |
| 8.0 | Dextrose |
| 300.0 | Crisco shortening |
| 25.0 | Lecithin |
| 0.3 | Amino acid blend (as above) |
| 3.0 | Kelset |
| 0.5 | Tween 60 |
| 0.5 | Atmos 300 |
| 1 drop (0.025) | Ammonium sulfide (20% aqueous solution) |
| 5.0 | Sodium bicarbonate |
| 4 drops (0.1) | β-Carotene (30% in vegetable oil) |

The product had an excellent egg yolk flavor, and was excellent for deviled eggs, when made with spices. Also, it was excellent in baked goods.

EXAMPLE 10

An amino acid blend (18 g.) was prepared, having the following composition:

| Grams | Amino Acid |
|---|---|
| 2.0 | DL-isoleucine |
| 3.0 | DL-leucine |
| 2.0 | DL-valine |
| 1.0 | DL-methionine |
| 0.5 | L-cysteine hydrochloride |
| 1.5 | DL-phenylalanine |
| 1.5 | L-tyrosine |
| 1.5 | Threonine |
| 0.5 | DL-tryptophane |
| 2.0 | L-lysine monohydrochloride |
| 0.5 | L-histidine |
| 2.0 | L-arginine hydrochloride |

A synthetic egg composition was prepared to the following formulation:

| Grams | Ingredient |
|---|---|
| 150.0 | Powdered egg albumen |
| 400.0 | Nestle Vee-Kreme (powdered vegetable oil base) |
| 25.0 | Lecithin |
| 0.3 | Amino acid blend (as above) |
| 3.0 | Kelset |
| 0.5 | Tween 60 |
| 0.5 | Atmos 300 |
| 1 drop (0.025) | Ammonium sulfide (20% aqueous solution) |
| 5.0 | Sodium bicarbonate |
| 4 drops (0.15) | β-Carotene (30% in vegetable oil) |

An amount corresponding to 7.5 g. of this composition was mixed with 30 g. of water, and fried with butter. The taste and appearance were indistinguishable from those of fresh scrambled eggs.

EXAMPLE 11

An amino acid blend (18 g.) was prepared, having the following composition:

| Grams | Amino Acid |
|---|---|
| 2.0 | DL-isoleucine |
| 3.0 | DL-leucine |
| 2.0 | DL-valine |
| 1.0 | DL-methionine |
| 0.5 | L-cysteine hydrochloride |
| 1.5 | DL-phenylalanine |
| 1.5 | L-tyrosine |
| 1.5 | Threonine |
| 0.5 | DL-tryptophane |
| 2.0 | L-lysine monohydrochloride |
| 0.5 | L-histidine |
| 2.0 | L-arginine hydrochloride |

A synthetic egg composition was prepared to the following formulation:

| Grams | Ingredient |
|---|---|
| 125.0 | Powdered egg albumen |
| 170.0 | Nestle vegetable oil base (powder) |
| 6.5 | Dextrose |
| 10.0 | Lecithin |
| 5.0 | Sodium bicarbonate |
| 0.3 | Amino acid blend (as above) |
| 15.0 | Powdered milk |
| 1 drop | β-Carotene (30% in vegetable oil) |
| 5.0 | Kelset |
| 20 drops | Tween 60 |
| 20 drops | Atmos 300 |
| 0.6 | Monosodium glutamate |
| 0.05 | Ribotide |
| Trace | Sodium hydrosulfide |

The powdered synthetic egg composition was mixed with different proportions of water, then fried with butter in a manner of preparing scrambled eggs. In all tests, the results were excellent as to flavor and taste. A proportion of synthetic composition to water of about 3:5 approximates fresh egg consistency.

EXAMPLE 12

An amino acid blend (18 g.) was prepared, having the following composition:

| Grams | Amino Acid |
|---|---|
| 2.0 | DL-isoleucine |
| 3.0 | DL-leucine |
| 2.0 | DL-valine |
| 1.0 | DL-methionine |
| 0.5 | L-cysteine hydrochloride |
| 1.5 | DL-phenylalanine |
| 1.5 | L-tyrosine |
| 1.5 | Threonine |
| 0.5 | DL-tryptophane |
| 2.0 | L-lysine monohydrochloride |
| 0.5 | L-histidine |
| 2.0 | L-arginine hydrochloride |

A synthetic egg composition was prepared to the following formulation:

| Grams | Ingredient |
|---|---|
| 125.0 | Lactalbumin (dried powder) |
| 170.0 | Vee-Kreme (spray-dried vegetable oil base) |
| 10.0 | Lecithin |
| 5.0 | Sodium bicarbonate |
| 0.3 | Amino acid blend (as above) |
| 15.0 | Dry milk |
| 1 drop | β-Carotene (30% in vegetable oil) |
| 5.0 | Kelset |
| 20 drops | Tween 60 |
| 20 drops | Atmos 300 |
| 0.6 | Monosodium glutamate |
| 0.05 | Ribotide |
| Trace | Hydrogen sulfide |

One drop of ammonium sulfide was put on filter paper, and placed in a jar of this composition. The solid materials were mixed together. The emulsifiers and color were blended, and added slowly to the dry mix while mixing on a Sunbeam mixer. When thoroughly mixed, the mixture was passed through a 30-mesh screen. The dried synthetic egg composition tested in various manners as previously described gave excellent results.

EXAMPLE 13

An amino acid blend (18 g.) was prepared, having the following composition:

| Grams | Amino Acid |
|---|---|
| 2.0 | DL-isoleucine |
| 3.0 | DL-leucine |
| 2.0 | DL-valine |
| 1.0 | DL-methionine |
| 0.5 | L-cysteine hydrochloride |
| 1.5 | DL-phenylalanine |
| 1.5 | L-tyrosine |
| 1.5 | Threonine |
| 0.5 | DL-tryptophane |
| 2.0 | L-lysine monohydrochloride |
| 0.5 | L-histidine |
| 2.0 | L-arginine hydrochloride |

A synthetic egg composition was prepared, to the following formulation:

| Grams | Ingredient |
|---|---|
| 125.0 | Serum albumin (dried powder) |
| 170.0 | Vee-Kreme (spray-dried vegetable oil) |
| 10.0 | Lecithin |
| 5.0 | Sodium bicarbonate |
| 0.3 | Amino acid blend (as above) |
| 2 drops | β-Carotene (30% in vegetable oil) |
| 5.0 | Kelset |
| 20 drops | Tween 60 |
| 20 drops | Atmos 300 |
| 0.3 | Monosodium glutamate |
| 0.025 | Ribotide |
| 1 drop | Ammonium sulfide (20% aqueous solution) |

One drop of ammonium sulfide was put on filter paper, and placed in a jar of the composition. The solid materials were mixed together. The emulsifiers and color were blended, and added slowly to the dry mix while mixing on a Sunbeam mixer. When thoroughly mixed, the mixture was passed through a 30-mesh screen. The dried synthetic egg composition tested in the manners previously described was excellent in all respects.

Having regard to the foregoing disclosure, the following is claimed as the inventive and patentable embodiments thereof:

1. A synthetic egg composition having a flavor corresponding to chicken eggs and having an alkaline pH within the range from about 7 to about 9.5 in the presence of water, comprising, as the essential ingredients, at least one member selected from the group consisting of water-soluble albumin and edible fatty oil, the water-soluble albumin being in an amount within the range from about 0% to about 90%; and the edible fatty oil being in an amount within the range from about 0% to about 90%, the amounts being selected within the said ranges to provide body and texture to the synthetic egg composition; at least one amino acid in an amount within the range from about 0.0% to about 5% and selected from the group consisting of DL-isoleucine, DL-leucine, DL-valine, DL-methionine, threonine, DL-tryptophane, L-cysteine, DL-phenylalanine, L-tyrosine, L-lysine, L-histidine, L-arginine, β-alanine, glutamic acid, cystine, glycine, aspargine, aspartic acid, serine, gentamine, proline, hydroxyproline, thyroxine, thiozine, and hydroxylysine; an inorganic sulfide in an amount within the range from about 0.00001% to about 0.1% and selected from the group consisting of alkali metal, alkaline earth metal and ammonium sulfides; and an alkaline compound in an amount to impart a pH within the stated range, the combination of amino acid and inorganic sulfide being in an amount sufficient with an alkaline pH to contribute an egg flavor and the water-soluble albumin and fatty oil contributing body and texture to the composition.

2. A composition according to claim 1, formulated as an aqueous solution or dispersion.

3. A composition according to claim 1, formulated as a paste.

4. A composition according to claim 1, formulated as a dry powder.

5. A composition according to claim 1, comprising a water-soluble albumin.

6. A composition according to claim 1, comprising an edible fatty oil.

7. A composition according to claim 6, comprising both an edible fatty oil and a water-soluble albumin.

8. A composition according to claim 1, in which the amino acid is selected from the group consisting of DL-isoleucine, DL-leucine, DL-valine, DL-methionine, threonine, DL-tryptophane, L-cysteine, DL-phenylalanine, tyrosine, L-lysine, L-histidine, L-arginine, β-alanine, glutamic acid, cystine, and glycine.

9. A composition according to claim 8, in which the amino acid is a mixture of DL-isoleucine, DL-leucine, DL-valine, DL-methionine, L-cysteine hydrochloride, DL-phenylalanine, L-tyrosine, threonine, DL-tryptophane, L-lysine monohydrochloride, L-histidine, and L-arginine hydrochloride.

10. A composition according to claim 1, in which the amino acid is in the form of a protein hydrolysate in peptide nonultimate amino acid form.

11. A composition according to claim 1, in which the water-soluble albumin is selected from the group consisting of grain albumin, soybean albumin, ovalbumin, serum albumin, and lactalbumin.

12. A composition according to claim 1, in which the edible fatty oil is a mono-, di-, or tri-glyceride derived from a natural oil or fat.

13. A composition according to claim 1, in which the pH is brought to within the range from about 7 to about 9.5 by addition of an edible alkaline compound selected from the group consisting of alkali metal and alkaline earth metal hydroxides, carbonates, and bicarbonates.

14. A composition according to claim 13, in which the amount of the alkaline compound is within the range from about 0.05% to about 10%.

15. A composition according to claim 1, having the formulation:

| Ingredient | Range - % |
|---|---|
| Amino acid | 0.001 to 5 |
| Inorganic sulfide | 0.00001 to 0.1 |
| Albumin | 0 to 90 |
| Fatty oil | 0 to 90 |
| Lecithin | 0 to 25 |
| Milk products | 0 to 20 |
| Sugar | 0 to 10 |
| Miscellaneous (Emulsifiers, palate sensitizers, coloring agents, mineral salts) | 0 to 10 |
| pH | 7 to 9.5 |

16. A composition according to claim 1, comprising at least one substance selected from the group consisting of sugars, mineral salts, lecithin; milk products, surfactants, sodium inosinate, sodium guanylate, sodium and calcium alginates; and coloring agents in an amount within the range from 0.0001% to about 25% by weight of the solids.

17. A composition according to claim 1, in which the inorganic sulfide is ammonium sulfide.

18. A composition according to claim 1, in which the inorganic sulfide is hydrogen sulfide.

* * * * *